United States Patent [19]
Kluger et al.

[11] 3,976,331
[45] Aug. 24, 1976

[54] VERTICAL FEEDER FOR POWDERED MATERIAL

[75] Inventors: Wolfgang Kluger, Neubeckum; Heinz Hüser, Ahlen, both of Germany

[73] Assignee: Polysius AG, Neubeckum, Germany

[22] Filed: June 27, 1975

[21] Appl. No.: 591,137

[30] Foreign Application Priority Data
July 30, 1974   Germany...................... 7425955[U]

[52] U.S. Cl................................... 302/53; 222/61; 222/193; 302/35; 302/42
[51] Int. Cl.²........................................ B65G 53/66
[58] Field of Search .................. 302/35, 42, 53, 57; 222/57, 61, 193

[56] References Cited
UNITED STATES PATENTS 2,850,329  9/1958  Pyle et al. .............................. 302/53
3,179,378  4/1965  Zenz et al. ............................. 302/53

Primary Examiner—Evon C. Blunk
Assistant Examiner—Jeffrey V. Nase
Attorney, Agent, or Firm—Learman & McCulloch

[57] ABSTRACT

A vertical feeder for the pneumatic feeding of powdered material comprises a pressure vessel having an upper inlet for the material, a base aeratable by fluidizing air, a feed-air nozzle projecting through the base into the vessel, and a feed pipe extending substantially from the top downwards into the vessel and terminating above the feed-air nozzle in communication with a material feeding conduit. A cut-off valve is located in the feed-air inlet pipe and closes when the supply of material ceases.

8 Claims, 1 Drawing Figure

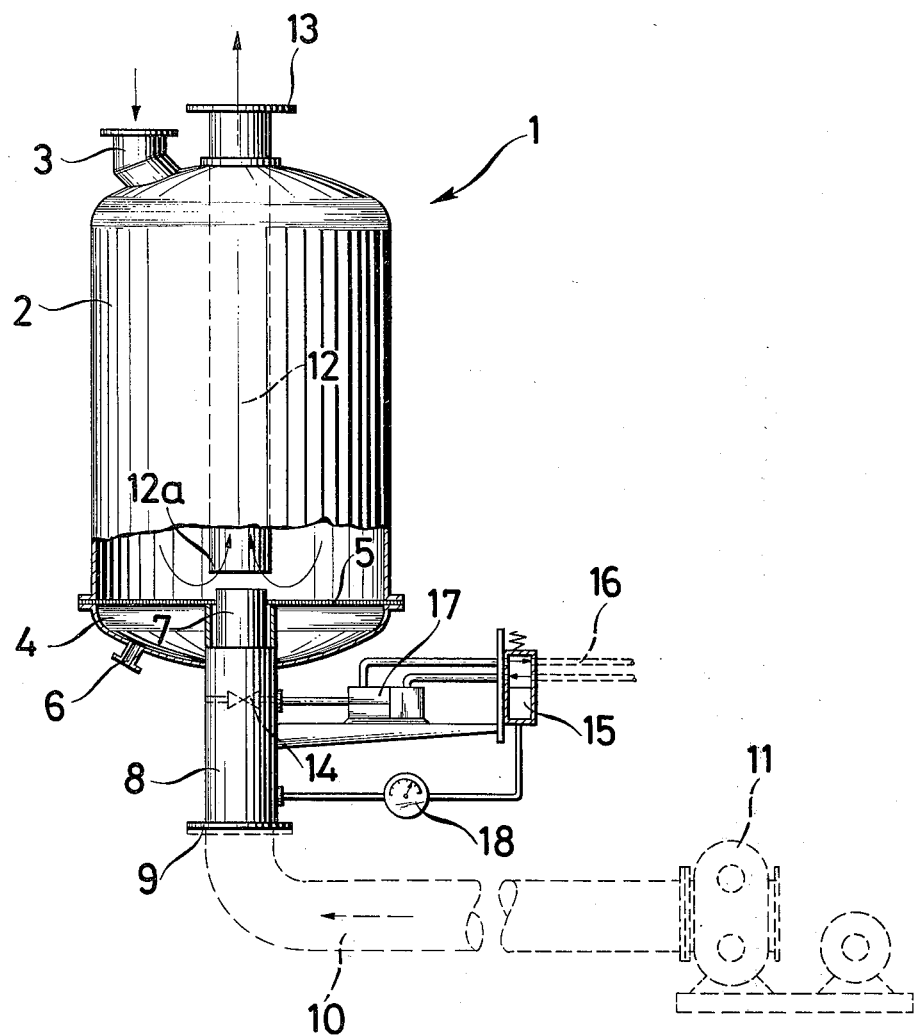

VERTICAL FEEDER FOR POWDERED MATERIAL

In the conveyance of material with vertical feeders of the type described, it is sometimes found in practice that interruptions occur, for instance in the feed-air supply (through failure of current). In such cases it is necessary for the feed-air nozzle to be closed immediately, and as closely as possible below the nozzle, so that material as it drops back cannot block the feed-air inlet pipe or the conduit, which would mean further difficulty when the pneumatic feed was restored.

For this reason it is known in practice to use various non-return valves, usually operated mechanically, with weights or spring loading. It has however often been found that these known cut-out members are not reliable and operate very unsatisfactorily. For example, the known constructions do not close quickly enough in the required manner, and it is also usually difficult to resume pneumatic feeding after a blockage has been corrected.

The invention therefore has for its objective the provision of a vertical feeder having a non-return device which will ensure rapid and reliable closure of the feed-air inlet pipe after either intended or unintended cutting off of the feed-air supply, and at the same time ensure that the pneumatic conveyance of the material can be resumed without difficulty.

According to the invention this objective is achieved in that the closure member comprises a pneumatically controlled non-return valve associated with a multi-way electro-magnetic valve responsive to the feed-air supply through the feed-air inlet pipe, and wherein the non-return valve can be connected to a separate control air pipe.

With a pneumatic vertical feeder of the construction provided by the invention, if the feed-air supply ceases or drops to too low a value, the multi-way electro-magnetic valve of the non-return valve receives a signal which immediately reverses the valve automatically, i.e., closes it. A non-return valve formed in this manner can react extremely rapidly to changes in the feed-air supply, so that with its pneumatic control and operation the non-return valve can immediately close the feed-air inlet pipe effectively against material which is flowing backwards. Since the pneumatic operating elements of the non-return valve can be connected to a separate control air pipe, the closing of the non-return valve takes place completely independently of the feed-air supply, once the signal has been emitted to indicate that such supply is inadequate.

When the pneumatic feeding is to be resumed, increase in the feed-air supply in the feed-air inlet pipe enables the conveyance of material to be resumed practically automatically, this being operable with the cut-off valve by substantially the reverse of the closing process.

With this reliable and effective functioning the vertical feeder in accordance with the invention can be made with a relatively simple construction, especially as regards the non-return element.

One embodiment of the invention is described below in more detail, with reference to the drawing figure which is a vertical schematic view of a feeder according to the invention.

The vertical feeder 1 shown in the drawing is adapted for the pneumatic feeding of powdered material and comprises a cylindrical pressure vessel 2, in this case generally vertically disposed, having in its top cover a closable material inlet 3. At its bottom end is a double base 4 including a porous, air-permeable support 5 on which the material rests, and which can also be supplied with fluidising air, for example via an inlet 6, so that the material in the vessel 2 can be fluidised for uniform feeding and put into a flowable condition, in generally known manner. The porous support 5 of the vessel base 4 can be generally flat, as shown in the drawing, or it can have a funnel shape.

Into the base 4 of the vessel there projects from below a feed-air nozzle 7 to whose lower end is connected a feed-air inlet pipe 8 having at its free end a flange 9 whereby the pipe 8 can be connected to a feed-air supply pipe 10, indicated merely by dotted lines, the feed-air being derived from a blower 11, also only shown in dotted lines.

Into the pressure vessel 2 there projects from above a feed pipe 12 whose lower end 12a ends generally above the feed-air nozzle 7 which may project through the porous support 5 into the pressure vessel 2. The end of feed pipe 12 which projects from the top of the pressure vessel 2 is provided with a flange 13 whereby it can be connected to a feed conduit, not shown.

With the embodiment shown in the drawing, the feed-air nozzle 7 and the feed pipe 12 are arranged generally coaxially in the cylindrical pressure vessel 2 and hence with each other. The apertures of the feed-air nozzle 7 and of the end 12 of the feed pipe can be a short distance one above the other; it is however also possible for the nozzle 7 to protrude slightly into the feed pipe end 12a. Instead of the completely cylindrical feed pipe 12 as shown, a feed pipe could also be used whose lower end 12a has a broadened diameter, for instance in a conical or trumpet shape.

Relatively close below the upper end of the feed nozzle 7 there is in the feed-air inlet pipe 8 a cut-off member formed as a normally open, non-return valve 14, which when the material stops flowing blocks the inlet pipe 8 against the return or downward flow of material, hence providing a non-return device for the pneumatic vertical feeder 1.

The non-return valve 14 is pneumatically controlled, the valve 14 being associated with a multi-way electro-magnetic valve, preferably a four-way electro-magnetic valve 15 of known construction, whereby the valve 14 can be connected to separate inlet and outlet control air pipes 16, shown only in dotted lines in the drawing, and fitted to a source of air. This four-way electro-magnetic valve 15, preferably formed as a permanent signal emitter, has a valve body which responds to the air supply through the feed-air inlet pipe 8. This electro-magnetic valve 15 is coupled to a double acting controllable pneumatic cylinder and piston unit 17 of the non-return valve 14, the arrangement preferably being such that in the presence of an electrical potential the valve body occupies a position such that the cylinder and piston unit 17 is subjected to air pressure which keeps the non-return valve 14 in its open position, while in the absence of such potential the cylinder and piston unit 17 has air applied to it which immediately closes the non-return valve 14. The control signal for the electro-magnetic valve 15 can be brought about by the pressure difference or a predetermined amount of air flow supplied in the region upstream of the feed-air nozzle 7. It is however also possible to connect the electromagnetic valve 15 electrically with the drive motor for the feed-air blower 11 by a simple wiring circuit so that if the motor stops, and hence the supply of feed-air to the feed-air inlet pipe 8, a signal is immediately sent to the valve 15 so that the non-return valve 14 is immediately and automatically put into its closed position.

In fluid communication with the feed-air inlet pipe 8, upstream of the non-return valve 14, there is provided a contact manometer 18 of known construction which for control purposes is in pneumatic communication with the air-feed supply pipe 8 and is connected electrically directly or via a suitable control member with the electro-magnetic valve 15. With this contact manometer 18 the electro-magnetic valve 15 can be generally set for automatic opening and closing of the non-return valve 14 whenever the air flow through the pipe reaches or falls below a predetermined value to convey material. The provision of this contact manometer 18 is however of particular advantage upon the resumption of the pneumatic conveyance of material. Thus, if the conveyance has been interrupted, for example by a preceding brief cessation of current supplies or the like, and has to be re-started, the non-return valve 14 in the feed-air inlet pipe 8 can be kept closed until the contact manometer 18 shown by an appropriate signal that the feed-air pressure is sufficiently high to enable conveyance of the material to be resumed; the signal from the contact manometer 18 then actuates the electro-magnetic valve 15 so that the non-return valve 14 is opened by the cylinder and the piston unit. All these control procedures for both closing and opening the nonreturn valve 14 takes place automatically.

The feeding principle of the pneumatic vertical feeder in accordance with the invention should otherwise be adequately known, so that description thereof is unnecessary.

What is claimed is:

1. A vertical feeder for the pneumatic feeding of powdered material comprising a pressure vessel having an inlet for material; a base; feed-air supply means extending through said base into said vessel; material feed means extending into said vessel from the top thereof and communicating with said feed-air supply means; means for supplying feed-air through said feed-air supply means into said feed means; normally open valve means in said feed-air supply means operable to open and close said feed-air supply means; pneumatic operating means coupled to said valve means for operating the latter; and electro-magnetic control means responsive to the absence of predetermined feed-air flow through said feed-air means to close said valve means.

2. A feeder according to claim 1 wherein said pneumatic operating means is connected to its own source of air.

3. A feeder according to claim 1 wherein said pneumatic operating means comprises a double acting cylinder and piston unit.

4. A feeder according to claim 1 wherein said control means comprises a multi-way electro-magnetic valve.

5. A feeder according to claim 4 wherein said electro-magnetic valve includes a valve body movable between open and closed positions and wherein in response to the application and termination, respectively, of electrical current to said electromagnetic valve.

6. a feeder according to claim 4 wherein said electromagnetic valve is a four-way valve.

7. A feeder according to claim 1 wherein said control means includes a contact manometer in communication with said feed-air supply means and electrically connected to said electromagnetic control means.

8. A feeder according to claim 1 wherein said electromagnetic control means continuously is energized as long as said feed-air flow is at or above said predetermined flow.

* * * * *